(12) United States Patent
Kim (10) Patent No.: US 7,242,905 B2
(45) Date of Patent: Jul. 10, 2007

(54) METHOD OF INFORMATION SHARING BETWEEN CELLULAR AND LOCAL WIRELESS COMMUNICATION SYSTEMS

(75) Inventor: Sung-Jin Kim, Daegukwangyeok-shi (KR)

(73) Assignee: Samsung Electronics Co., Ltd. (KR)

( * ) Notice: Subject to any disclaimer, the term of this patent is extended or adjusted under 35 U.S.C. 154(b) by 576 days.

(21) Appl. No.: 09/992,934

(22) Filed: Nov. 5, 2001

(65) Prior Publication Data
US 2002/0065045 A1    May 30, 2002

(30) Foreign Application Priority Data
Nov. 27, 2000 (KR) .............................. 2000-71023
Apr. 18, 2001 (KR) .............................. 2001-20653

(51) Int. Cl.
*H04B 7/00* (2006.01)
(52) U.S. Cl. .................. 455/41.2; 455/412.1; 455/425; 370/328; 370/338
(58) Field of Classification Search ............... 455/41.2, 455/445, 412.1, 425; 370/329, 328, 338, 370/348
See application file for complete search history.

(56) References Cited

U.S. PATENT DOCUMENTS

| 6,532,228 B1* | 3/2003 | Burgess et al. ............. 370/349 |
| 6,600,902 B1* | 7/2003 | Bell ........................... 455/41.2 |
| 6,614,350 B1* | 9/2003 | Lunsford et al. ......... 340/572.1 |
| 6,665,549 B1* | 12/2003 | Reed ........................... 455/573 |
| 6,683,886 B1* | 1/2004 | van der Tuijn et al. ..... 370/458 |
| 6,731,939 B1* | 5/2004 | Watanabe et al. ........... 455/450 |
| 6,748,195 B1* | 6/2004 | Phillips ..................... 455/41.2 |
| 6,751,273 B1* | 6/2004 | Park et al. .................... 375/346 |
| 6,766,160 B1* | 7/2004 | Lemilainen et al. ........ 455/411 |
| 2002/0018458 A1* | 2/2002 | Aiello et al. ................. 370/348 |
| 2002/0028655 A1* | 3/2002 | Rosener et al. ............... 455/16 |
| 2002/0061009 A1* | 5/2002 | Sorensen ..................... 370/351 |
| 2003/0021262 A1* | 1/2003 | Ma et al. ..................... 370/352 |

* cited by examiner

*Primary Examiner*—Matthew Anderson
*Assistant Examiner*—Tuan Pham
(74) *Attorney, Agent, or Firm*—The Farrell Law Firm (57) ABSTRACT

There is provided an information sharing method by Bluetooth™ wireless communication. To share information with a slave by Bluetooth™ wireless communication protocol, a portable cellular phone equipped with a Bluetooth™ module acting as a master in a piconet or scatternet receives data from a mobile communication system and stores the received data. The portable phone determines whether to transmit the data to the slave by Bluetooth™ wireless communication. If the data is to be transmitted to the slave, the portable phone converts the data to a data packet for Bluetooth™ communication and determines whether the portable phone is connected to the slave by an ACL (Asynchronous ConnectionLess) link or an SCO (Synchronous Connection-Oriented) link. If the ACL link is connected between the portable phone and the slave, another ACL link is established and the portable phone transmits the data packet to the slave on the established ACL link. If the SCO link is connected between the portable phone and the slave, an ACL link is established and the portable phone transmits the data packet to the slave on the established ACL link.

9 Claims, 6 Drawing Sheets

METHOD OF INFORMATION SHARING BETWEEN CELLULAR AND LOCAL WIRELESS COMMUNICATION SYSTEMS

This application claims priority to an application entitled "Method of Sharing Information by Bluetooth Wireless Communication" filed in the Korean Industrial Property Office on Nov. 27, 2000 and assigned Ser. No. 2000-71023, and an application entitled "Method of Sharing Information by Bluetooth Wireless Communication" filed in the Korean Industrial Property Office on Apr. 18, 2001 and assigned Ser. No. 2001-20653, the contents of which are hereby incorporated by reference.

BACKGROUND OF THE INVENTION

1. Field of the Invention

The present invention relates generally to a Bluetooth™ unit, and in particular, to a Bluetooth™ unit that is also equipped to receive mobile communication service.

2. Description of the Related Art

Bluetooth™ is a global de facto standard for short range wireless connectivity between mobile devices such as portable PCs and mobile phones. Based on a low-cost, short-range radio link, Bluetooth™ cuts the cord otherwise necessary for digital devices for short range data transfer. For example, a Bluetooth™ equipped mobile phone and a Bluetooth™ equipped laptop can establish a wireless connection Bluetooth™ and is likely to become the standard wireless communication protocol for short range, low power communication between PDAs (Personal Digital Assistants), desktops, facsimiles, keyboards, joysticks and a whole range of other digital devices.

Figure 1:
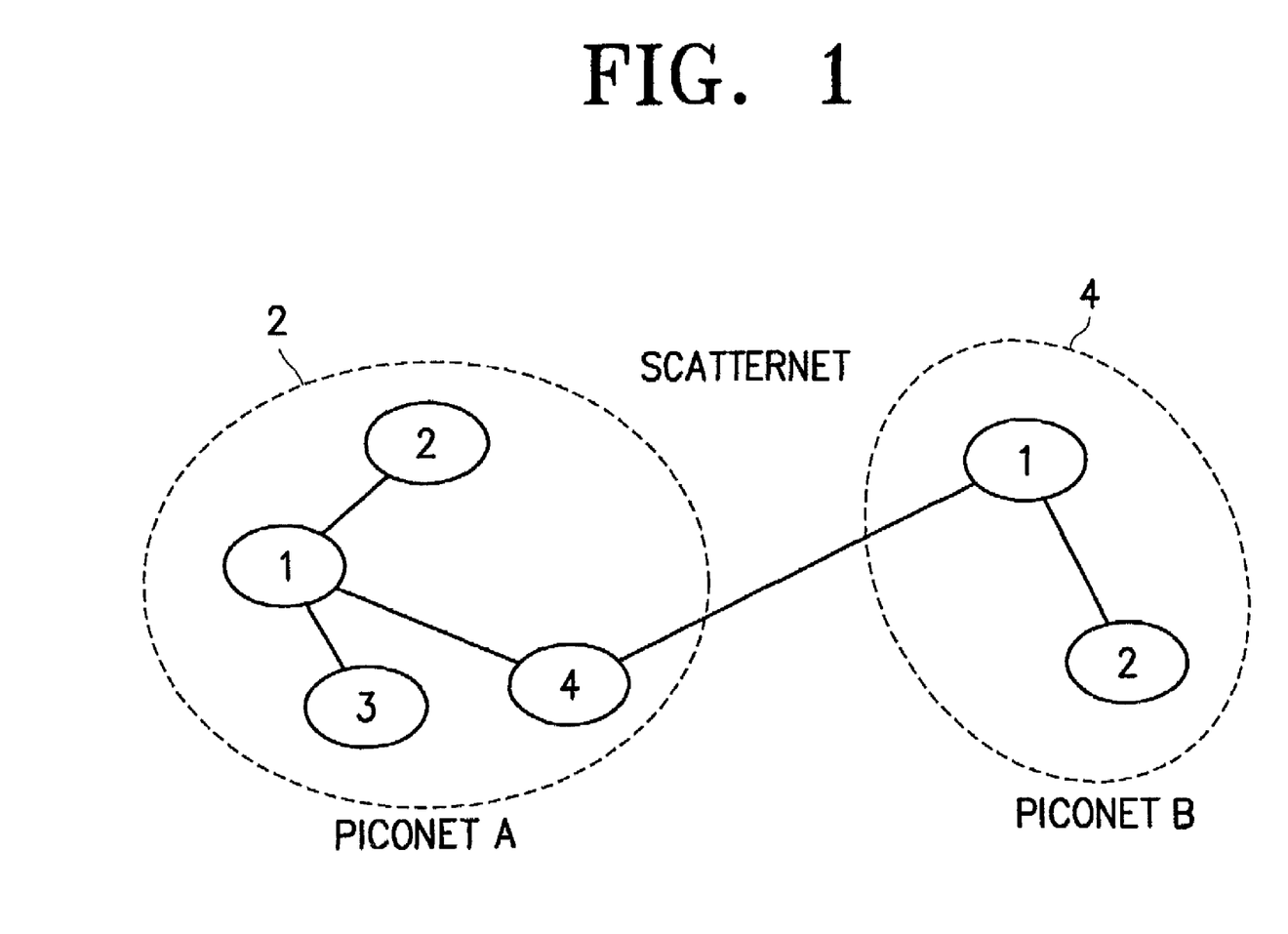
FIG. 1 illustrates the network configuration of a Bluetooth™ system known in the prior art to which the present invention is applied.

As shown in FIG. 1, a Bluetooth™ system supports a point-to-point or point-to-multipoint connection. A set of devices sharing a channel will typically also share capacity. This device set is called a piconet. The piconet is defined as a small ad hoc network created when two or more Bluetooth™-compatible devices recognize and communicate with each other. Up to seven Bluetooth™ units can join a piconet, with one unit acting as a master and the others acting as slaves. The master manages the piconet including generation of a frequency hopping pattern.

When no connection is established between Bluetooth™ units, this is called a standby state. In the standby state, each Bluetooth™ unit receives a new message every 1.28 sec. Upon receipt of a connection request, a Bluetooth™ unit becomes a master and then starts to recognize other Bluetooth™ units. Bluetooth™ units are then assigned an 8-bit park address. Slave Bluetooth™ units communicate with the master once they receive a 3-bit active address, forming a piconet. Among the eight addresses that are representable with three bits, one is used as a broadcast address and the other addresses will be assigned to the seven slave Bluetooth™ units that can join a piconet. The Bluetooth™ units in the active state can be divided into three modes: active mode, hold mode, and sniff mode. Although Bluetooth™ units in the hold mode and the sniff mode participate in forming the piconet, they have no influence on the total traffic and consume less power than units in the active mode. The master transmits an inquiry including a link key at every 625 μs interval and synchronizes with its slaves within two seconds. The slaves are then assigned 3-bit active addresses and, after receiving a page message from the master, are synchronized with the master using the hopping pattern determined by the master. An authentication process follows. An encryption key for authentication is formed by XOR-gating a random number generated by the master with the Medium Access Control (MAC) address of a slave. After the authentication, a data transmission state is entered.

The master controls all traffic on a channel. A plurality of independent and asynchronous piconets form a scatternet. Users of each piconet have a 1-MHz hop channel in the scatter net. Because the 1-MHz channel is not shared with other piconet units, the total throughput increases as piconets are added. Scatternets are formed by connecting piconets, wherein a Bluetooth™ unit can act as a slave in one piconet and as a master in another piconet.

While there exists message transmission technology for information sharing between master and slave units using Bluetooth™ communication system, the prior art does not allow sharing of information on a Bluetooth system when that information is received in a wireless communication format, typically by a Bluetooth™-equipped cellular phone. That is, a Bluetooth™ unit receiving a message from a mobile communication service (e.g., an SMS message) cannot retransmit that message to other Bluetooth™ units. In other words, although digital information can be shared between Bluetooth™ units, the subject invention provides a means of sharing a message received from a mobile communication service with devices connected by a Bluetooth™ system.

SUMMARY OF THE INVENTION

It is, therefore, an object of the present invention to provide a method of exchanging information received from a mobile communication system between Bluetooth™ units.

The foregoing and other objects can be achieved by providing an information sharing method by Bluetooth™ wireless communication. To share information with a slave by Bluetooth™ wireless communication, a portable phone equipped with a Bluetooth™ module as a master receives data from a mobile communication system and stores the received data. Assuming that the portable phone is acting as the master unit in the piconet, it will determine whether to transmit the data to the slave by Bluetooth™ wireless communication. If the data is to be transmitted to the slave, the portable phone converts the data to a data packet for Bluetooth™ communication and determines whether the portable phone is connected to the slave by an ACL (Asynchronous ConnectionLess) link or an SCO (Synchronous Connection-Oriented) link. If the ACL link is connected between the portable phone and the slave, another ACL link is established and the portable phone transmits the data packet to the slave on the established ACL link. If the SCO link is connected between the portable phone and the slave, an ACL link is established and the portable phone transmits the data packet to the slave on the established ACL link.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention with unnecessary detail that is well known to one of ordinary skill in the art.

Figure 2:
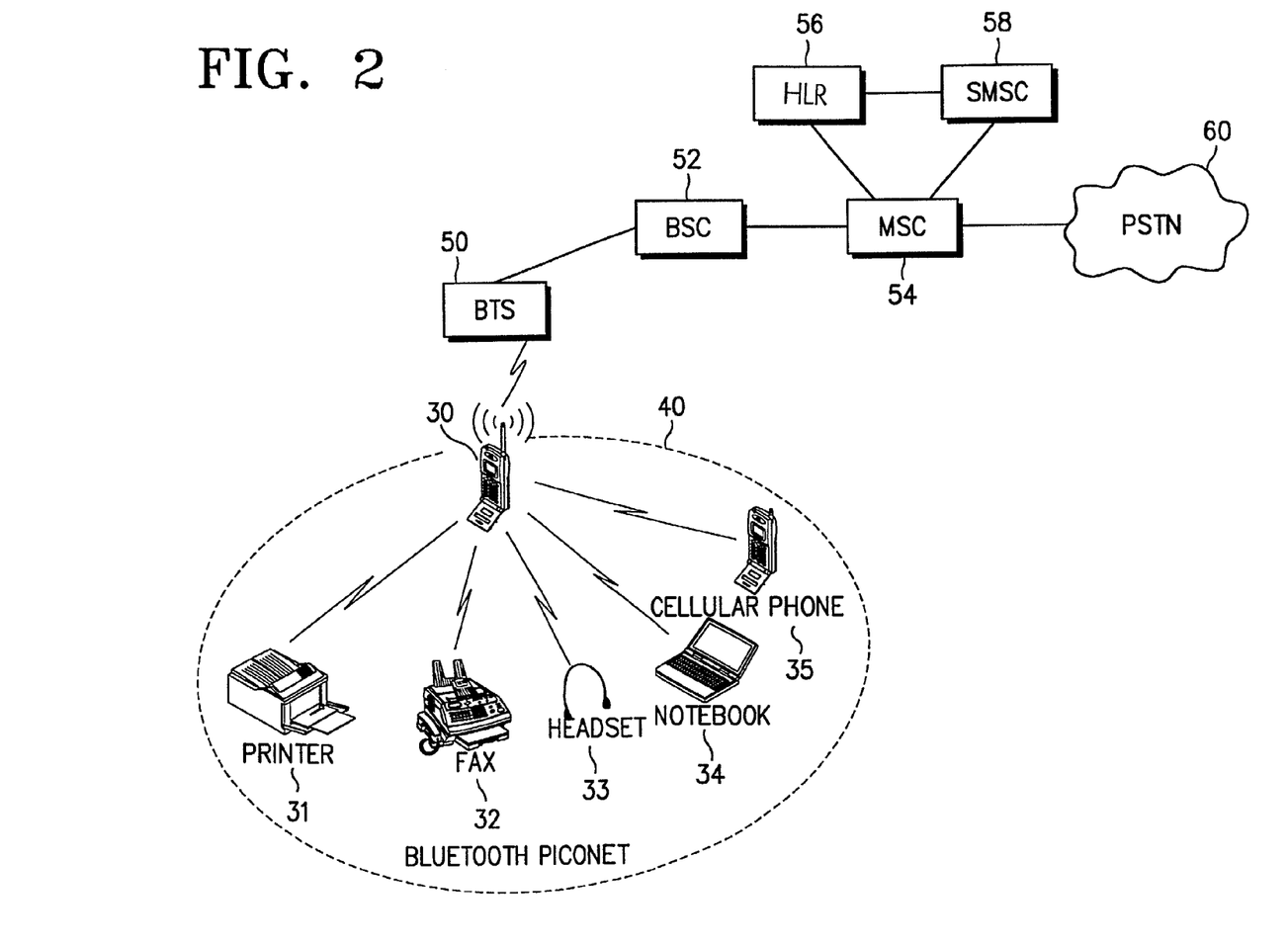
FIG. 2 illustrates a Bluetooth™ system receiving mobile communication services according to an embodiment of the present invention.

FIG. 2 illustrates a Bluetooth™ system receiving mobile communication services according to an embodiment of the present invention. While a Code Division Multiple Access (CDMA) system is described as a mobile communication system, it is obvious to those skilled in the art that the present invention is also applicable to other communication systems including Global System for Mobile Communication (GSM).

Referring to FIG. 2, an SMSC (Short Message Service Center) 58 is an independent node connected between an HLR (Home Location Register) 56 and an MSC (Mobile Switching Center) 54, for locating a receiver and transmitting SMS messages to mobile subscribers through the PLMN (Public Land Mobile Network). The SMSC 58 exchanges digits and characters between multiple character transmission systems including a PC communication system, an Internet server system, and mobile phones and subscribers. The SMSC 58 is connected to another network through an SMC (Short Message Client), not shown.

The MSC 54 interacts with another MSC (not shown) to process a call origination/termination request from a mobile phone 30. The MSC 54 refers to the HLR 56 for information about subscribers and, when an SMS message is received from the SMSC 58, it transmits the SMS message to a BSC (Base Station Controller) 52 so that the SMS message can be transmitted through a BTS (Base Transceiver Station) 50 via a paging channel. Message reception is performed in the reverse order in the same manner. The HLR 56 is a medium-level computer mainly processing subscriber information. The HLR 56 is largely divided into a network connection device, a subscriber database, and an operation management device. The BSC 52 controls a wireless link and a wired link and also performs a handoff so as not to interrupt a call when a subscriber roams. The BTS 50 communicates wirelessly with the mobile phone 30.

In addition to communicating via SMS, the mobile phone 30 can act as a master in a Bluetooth™ piconet and exchange SMS messages and/or Internet data. As stated before, the mobile phone 30 can simultaneously act as a master in one piconet and as a slave in another piconet when the two piconets are part of a scatternet. A master controls all traffic on a channel and secures slots to assign capacity to an SCO (Synchronous Connection-Oriented) link. Only when its MAC address is set in a master-to-slave slot, a slave can transmit in a slave-to-master slot. A master-to-slave packet selects a slave. That is, a traffic packet transmitted to one slave will also be automatically received by another slave. If the master has no information to a slave, it will not use a packet selecting that slave. Each packet is comprised of an access code and a header. This central polling scheme removes conflict between slave transmissions.

Figure 3:
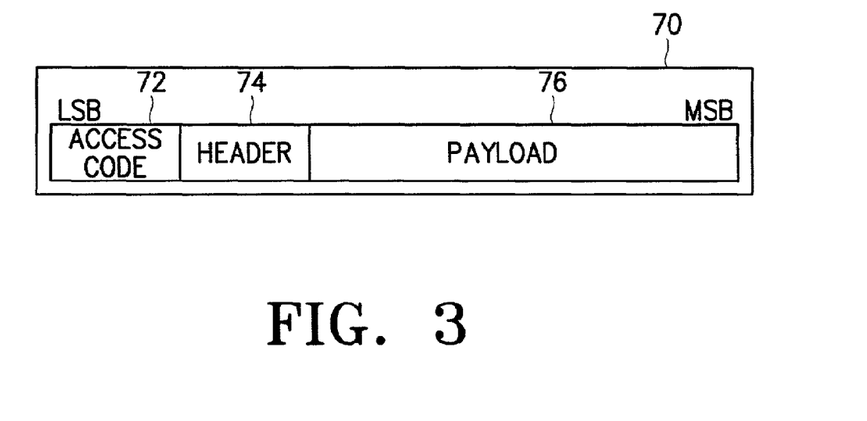
FIG. 3 illustrates the format of packets used in Bluetooth™ communication according to the present invention.

FIG. 3 illustrates the data packet format used for Bluetooth™ communication according to the present invention. Data is transmitted in packets on a piconet channel. Referring to FIG. 3, each packet 70 includes at least three parts: an access code 72, a header 74, and a payload 76. The access code 72 and the header 74 are typically of fixed length, 72 and 54 bits, respectively. The payload 76 ranges between 0 to 2745 bits.

The access code 72 is the first part of the packet 70 that is transmitted. If the header 74 follows, the access code 72 is 72 bits and in the absence of the header 74, the access code 72 is 68 bits. The access code 72 serves several purposes, including synchronization, DC offset compensation, and identification. The access code 72 identifies the packets that are transmitted on a channel in a piconet. All packets within an identical piconet have the same channel access code 72. The packet header 74 includes link control information. The payload 76 typically has two fields: a synchronous voice field and an asynchronous data field. An ACL (Asynchronous ConnectionLess) packet has only a data field, and an SCO (Synchronous Connection-Oriented) packet has only a field with voice-type data.

Figure 4:
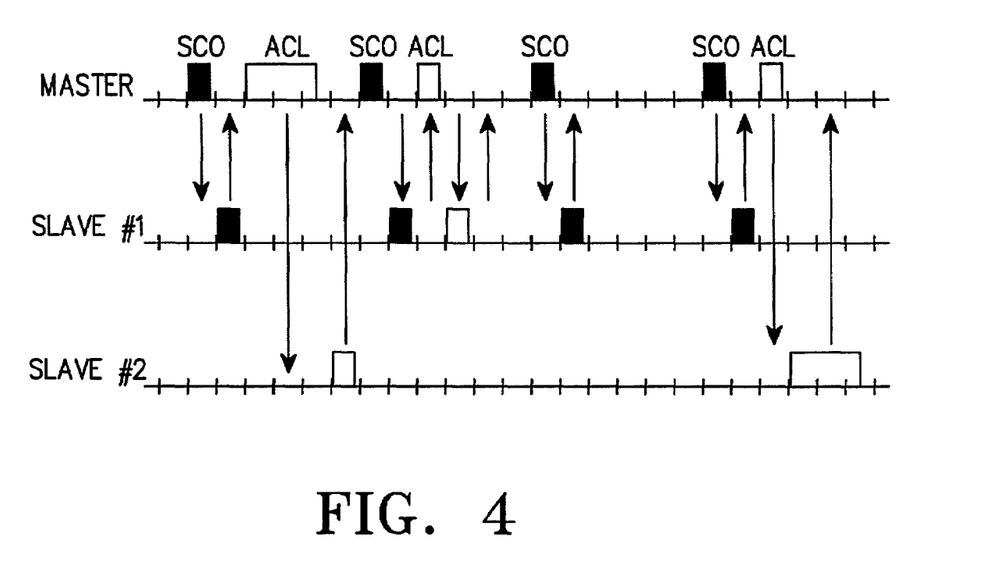
FIG. 4 illustrates mixed links between a master and slaves in Bluetooth™ communication.

FIG. 4 illustrates an example of mixed link between a master and slave in Bluetooth™ communication.

Referring to FIG. 4, a master communicates with slave #1 on an SCO link and with slave #2 on an ACL link. The SCO link selects usually a symmetrical circuit switching scheme for voice-type data and supports a point-to-point communication between a master and a single slave. The ACL link selects a symmetrical/asymmetrical packet switching scheme for transmission of burst data and supports a point-to-multipoint communication between a master and all slaves. The master uses polling to control ACL communication. An SCO connection is symmetrical and typically supports voice transmission with time boundaries. SCO packets are transmitted for a reserved period. Once a connection is established, the master and a slave exchange SCO packets without being polled. An ACL connection is packet-oriented and supports both symmetrical transmission and asymmetrical transmission. The master controls a link band and determines how much piconet band is to be assigned to each slave and whether symmetry is to be provided to transmission. Slaves are typically polled before data is transmitted.

In FIG. 4, since the master communicates with slave #1 on the SCO link, SCO packets are exchanged for reserved symmetrical periods, and since the master communicates with slave #2 on the ACL link, ACL packets are exchanged for asymmetrical periods without SCO packets.

Figure 5:
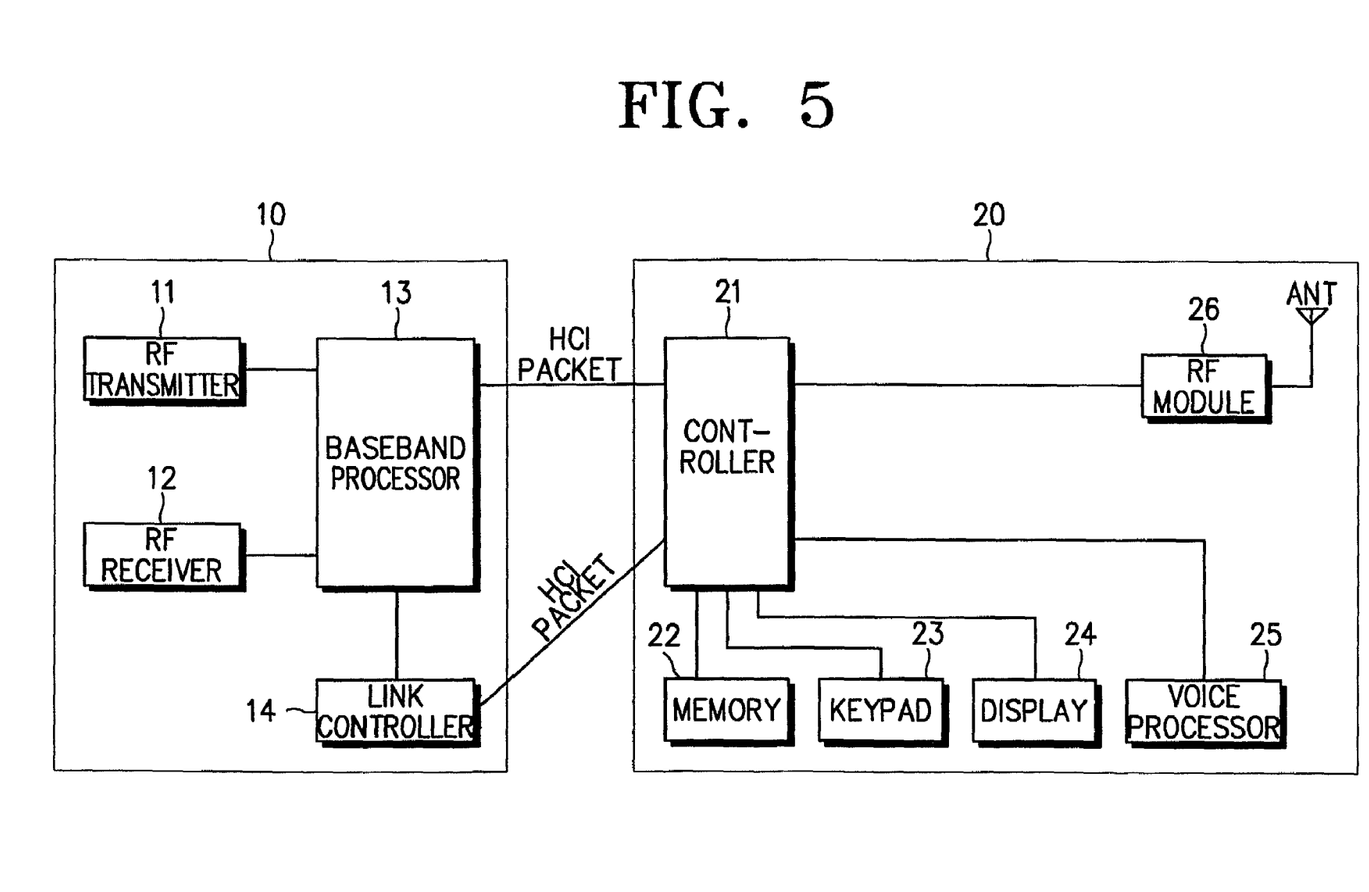
FIG. 5 is a block diagram of a mobile phone having a Bluetooth module according to the embodiment of the present invention.

FIG. 5 is a block diagram of a mobile phone with a Bluetooth™ module according to the embodiment of the present invention.

Referring to FIG. 5, a Bluetooth™ module 10 includes an RF (Radio Frequency) transmitter 11, an RF receiver 12, a baseband processor 13, and a link controller 14. The baseband processor 13 and the link controller 14 are connected to a mobile phone controller 21 via an HCI (Host Control Interface), for exchanging control commands and user data in HCI packets. HCI packets include command, event, and data packets.

The RF transmitter 11 modulates radio data received from the baseband processor 13 in a particular frequency band and amplifies the modulated signal prior to transmission. The RF receiver 12 receives an RF signal, amplifies a signal in a predetermined frequency band while suppressing amplification of the noise of the frequency signal, and converts the frequency of the amplified signal to a base band.

The baseband processor 13 converts a data packet received from the controller 21 to a packet suitable for Bluetooth™ communication by adding an access code and a header to the data packet, converts the Bluetooth™ packet to a predetermined data packet for wireless communication, and transmits the data packet in a predetermined frequency band through the RF transmitter 11. The baseband processor 13 also converts a data packet received from the RF receiver 12 to an HCI packet and feeds the HCI packet to the controller 21.

The link controller 14 controls the Bluetooth™ module 10 based on a command packet received from the controller 21 and transmits a request from a master and result information received from the baseband processor 13 to the controller 21 in HCI packets.

A mobile phone portion 20 includes the controller 21, a memory 22, a keypad 23, a display 24, a voice processor 25, and an RF module 26. The controller 21 provides overall control of the mobile phone. The RF module 26 transmits/receives voice data and control data under the control of the controller 21. The voice processor 25 converts voice data received from the RF module 26 to an audible sound and outputs the audible sound through a speaker and is under the control of the controller 21. The voice processor 25 also converts a voice signal received from a microphone to voice data and outputs the voice data to the RF module 26 and is under the control of the controller 21. The keypad 23 includes a plurality of alphanumeric and function keys and outputs data corresponding to the key(s) pressed by a user to control the controller 21. The display 24 displays messages and is under the control of the controller 21. The memory 22 has a program memory for storing key input data required for control of the operation of the mobile phone according to the present invention and program data and a data memory for storing control data and data generated during user-related operations.

As described above, a mobile phone of the kind depicted in FIG. 5 that is equipped with a Bluetooth™ module can communicate SMS messages or service information, including Internet data received, that is received from a mobile communication system in a Bluetooth™ wireless communication.

Figure 6:
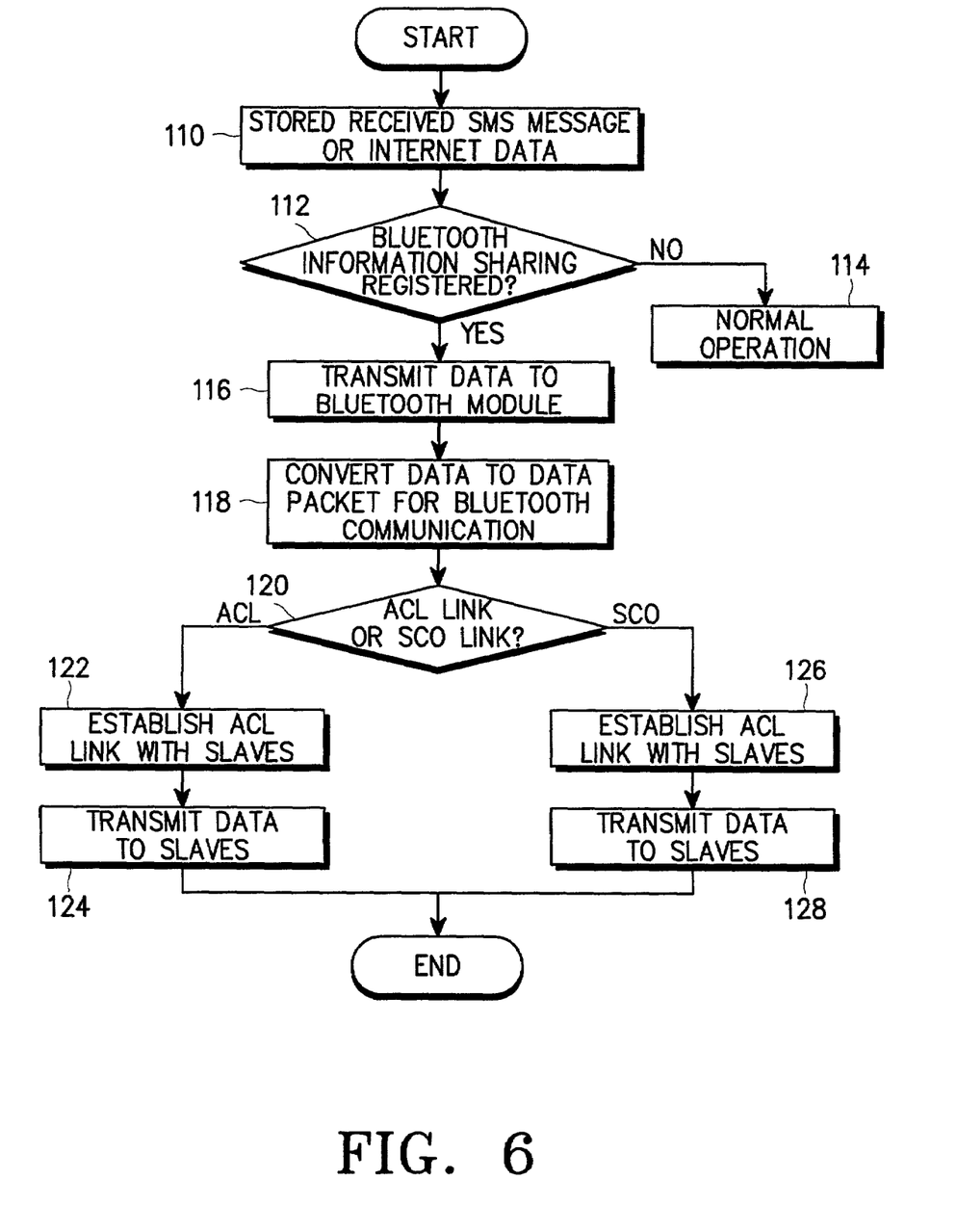
FIG. 6 is a flowchart illustrating a control operation for transmitting data received from a mobile communication system to a slave by a master Bluetooth™ unit according to the present invention.

FIG. 6 is a flowchart illustrating a control operation for transmitting data received from a mobile communication system to a slave in a Bluetooth™ communication system according to the present invention. It is assumed here that the master is the mobile phone and that the master and slave have performed an inquiry process according the Bluetooth™ protocol. Upon receipt of an SMS message or Internet data through the RF module 26, the controller 21 of the mobile phone stores the received data in the memory 22. If the mobile phone is equipped for Bluetooth™ information sharing, the controller 21 transmits the stored data to the Bluetooth™ module 10. Then, the baseband processor 13 of the Bluetooth™ module 10 converts the data to a data packet for Bluetooth™ communication and transmits the data packet to the slave through the RF transmitter 11.

Now referring to FIG. 6, the controller 21 of the mobile phone receives an SMS message or Internet data from a mobile communication system and stores the received data in the memory 22 in step 110. In step 112, the controller 21 checks whether the mobile phone is equipped for Bluetooth™ information sharing. Bluetooth™ information sharing is requested by the user of the mobile phone so that the mobile phone, acting as a master, can transmit all received data to a slave in a piconet through the Bluetooth™ module. If the mobile phone is equipped for Bluetooth™ information sharing, the controller 21 transmits the received data to the Bluetooth™ module 10 in step 116. The baseband processor 13 of the Bluetooth™ module 10 converts the received data to a data packet in the format shown in FIG. 3 for Bluetooth™ communication in step 118.

In step 120, the baseband processor 13 checks whether a physical channel has been established between the master and a slave, that is, whether a channel has been established on an ACL link or an SCO link between the master and a slave. If an ACL link exists between the master and the slave, another ACL is established between the master and the other slaves in step 122. Referring to FIG. 4, even if the ACL link is connected between the master and slave #2, another ACL link is established between the master and slave #1. If a channel exists on an SCO link between the master and a slave, an ACL link is established between the master and the other slaves in step 126. In steps 124 and 128, the baseband processor 13 transmits the data to the slaves.

Figure 7:
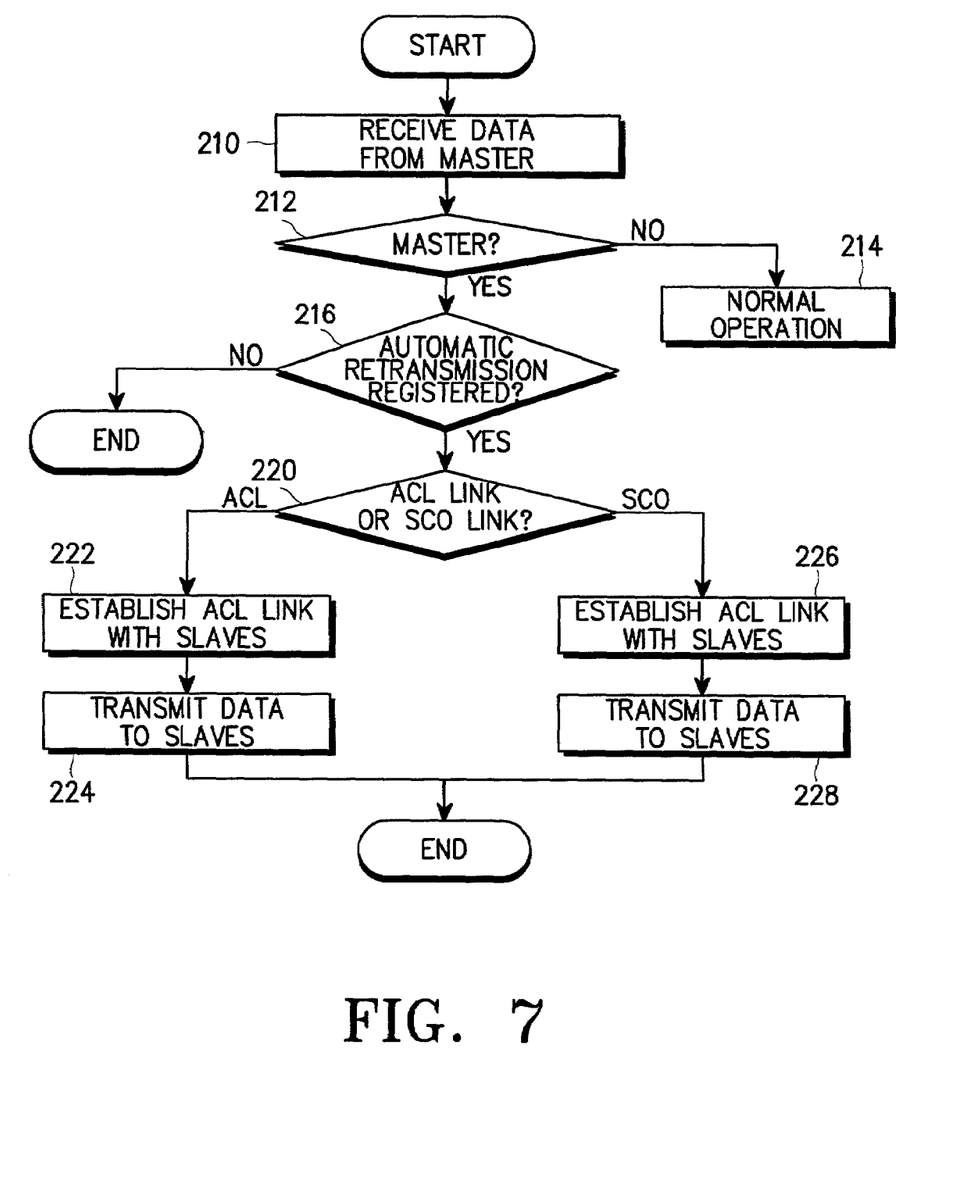
FIG. 7 is a flowchart illustrating a control operation for transmitting data received from the master of a scatternet that is received by a slave in the scatternet, where that slave also acts as a master in its piconet, and the retransmission onto another slave by Bluetooth™ communication according to the present invention.

FIG. 7 is a flowchart illustrating a control operation for transmitting data received from a master of one piconet that is received by a slave in the scatternet, with that slave also acting as a master in a second piconet.

As described above, in scatternet operation a single Bluetooth™ unit can act as both a master and a slave. In this case, the slave can transmit received data to a slave that it controls in the piconet within which it acts as a master. According to the present invention, the slave can transmit the received data automatically without a user command.

More specifically, upon receipt of an SMS message or Internet data from a master through the Bluetooth™ module 10, the controller 21 stores the received data in the memory 22. If the mobile phone is a master in another piconet and is registered for automatic transmission to another slave, the mobile phone transmits the data to the slave.

Referring to FIG. 7, upon receipt of an SMS message or Internet data from a master through the Bluetooth™ module 10, the controller 21 stores the received data in the memory 22 in step 210. The controller 21 determines whether the mobile phone is a master in another piconet in step 212. If the mobile phone is a master, the controller 21 checks whether the mobile phone is registered for automatic retransmission in step 216. If the automatic retransmission function is registered, the controller 21 transmits the received data to the Bluetooth™ module 10. Then, the baseband processor 13 of the Bluetooth™ module 10 checks whether a physical channel has been established between the master and a slave, that is, whether a channel has been established on an ACL link or an SCO link between the master and a slave in step 220. If an ACL link exists between the master and the slave, another ACL is established between the master and other slaves in step 222. If a channel exists on an SCO link between the master and a slave, an ACL link is established between the master and other slaves in step 226. In steps 224 and 228, the baseband processor 13 transmits the data to the plurality of slaves.

In accordance with the present invention, a mobile phone equipped with a Bluetooth™ module can share information received from a mobile communication with other Bluetooth™ units in a Bluetooth™ system by Bluetooth™ wireless communication.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of sharing data with a slave using Bluetooth™ wireless communication by a portable phone equipped with a Bluetooth™ module, where the portable phone acts as a master, comprising the steps of:

receiving the data from a mobile communication system in a first format and storing the received data in the first format;

determining whether to transmit the data to the slave by Bluetooth™ wireless communication;

adding an access code and a header to the data in the first format and converting the data from the first format to data packets for Bluetooth™ communication when it is determined that the data is to be transmitted to the slave;

determining whether the master is connected to the slave by a first ACL (Asynchronous Connection Less) link or an SCO (Synchronous Connection-Oriented) link;

establishing a second ACL link and transmitting the data packets to the slave on the established ACL link if it is determined that the ACL link connects the master and the slave; and establishing an ACL link and transmitting the data packets to the slave on the established ACL link if it is determined that the SCO link connects the master and the slave.

2. The method of claim 1, wherein the data is an SMS (Short Message Service) message.

3. The method of claim 1, wherein the data is Internet data.

4. A method of sharing information with a slave in a first piconet in a portable phone equipped with a Bluetooth™ module that is a master in the first piconet and a slave in a second piconet, comprising the steps of:

receiving data from a mobile communication system in a first format and storing the received data in the first format;

determining whether to transmit the data to the slave of the first piconet by Bluetooth™ wireless communication;

adding an access code and a header to the data in the first format and converting the data from the first format to data packets for Bluetooth™ communication when it is determined that the data is to be transmitted to the slave of the first piconet;

determining whether the portable phone is connected to the slave of the first piconet by an ACL (Asynchronous Connection Less) link or an SCO (Synchronous Connection-Oriented) link;

establishing another ACL link and transmitting the data packets to the slave of the first piconet on the established ACL link if it is determined that the ACL link connects the portable phone and the slave of the first piconet; and establishing an ACL link and transmitting the data packets to the slave of the first piconet on the established ACL link if it is determined that the SCO link connects the portable phone and the slave of the first piconet.

5. The method of claim 4, wherein the data is an SMS (Short Message Service) message.

6. The method of claim 4, wherein the data is Internet data.

7. A method of sharing information between a portable phone equipped with a Bluetooth™ module that is a slave in a first piconet and a master in a second piconet with a slave in the second piconet, comprising the steps of:

receiving data from a mobile communication system in a first format and storing the received data in the first format;

determining whether to transmit the data to the slave of the second piconet by Bluetooth™ wireless communication;

adding an access code and a header to the data in the first format and converting the data from the first format to data packets for Bluetooth™ communication when it is determined that the data is to be transmitted to the slave of the second piconet;

determining whether the portable phone is connected to the slave of the second piconet by an ACL (Asynchronous Connection Less) link or an SCO (Synchronous Connection-Oriented) link;

establishing another ACL link and transmitting the data packets to the slave of the second piconet on the established ACL link if it is determined that the ACL link connects the portable phone and the slave of the second piconet; and establishing an ACL link and transmitting the data packets to the slave of the second piconet on the established ACL link if it is determined that the SCO link connects the portable phone and the slave of the second piconet.

8. The method of claim 7, wherein the data is an SMS (Short Message Service) message.

9. The method of claim 7, wherein the data is Internet data.

* * * * *